Patented Feb. 3, 1925.

1,524,884

UNITED STATES PATENT OFFICE.

RURIC C. ROARK, OF BALTIMORE, MARYLAND.

INSECTICIDE.

No Drawing.  Application filed August 6, 1923. Serial No. 656,148.

*To all whom it may concern:*

Be it known that I, RURIC C. ROARK, a citizen of the United States of America, and resident of Baltimore, Baltimore city, State of Maryland, have invented certain new and useful Improvements in and Relating to Insecticides, of which the following is a specification.

This invention relates to insecticides; and the objects and nature of the invention will be readily understood by those skilled in the art in the light of the following explanation of examples from among others within the spirit and scope of my discovery and invention.

An object of the invention is to produce an insecticide that will overcome certain disadvantages inherent in insecticides heretofore proposed, and that will not be destructive to growing vegetation yet will be efficient in the control of chewing insects that infest such vegetation.

The poisonous action of soluble fluorides is well known and has been utilized for the control of injurious insects. For example, sodium fluoride, a salt readily soluble in water, is a very effective roach poison and is a common ingredient of roach powders. Potassium and barium fluorides, both soluble in water, have been similarly employed. Efforts to use these compounds for the control of insects upon growing vegetation have resulted disastrously in that the soluble salts seriously injure whatever vegetation they come into contact with. For this reason the valuable toxic properties of fluorides have never been utilized in agriculture for the control of insect pests on growing vegetation.

My invention consists in the use of a relatively insoluble fluoride in place of a readily soluble one.

I have found by careful tests that strontium fluoride (a relatively insoluble fluoride) does not injure the foliage of the apple tree and exhibits a toxicity to chewing insects as great as that of dilead arsenate. Calcium fluoride has also been tested and while not as toxic as strontium fluoride is effective as a stomach poison; and moreover is entirely inert as far as any action upon foliage is concerned. Other fluorides have been tested and as a result of these tests I have ascertained that fluorides as soluble as barium fluoride cannot safely be applied to growing plants, but that fluorides whose solubility in water is less than that of barium fluoride may be used in this way very successfully.

The solubility of the more common fluorides is stated in the literature to be as follows:

|   | Grams soluble in 1,000 grams water. |
|---|---|
| Barium fluoride | 1.63 at 18 degrees C. |
| Calcium fluoride | .016 " |
| Fluorspar | .014 " |
| Lead fluoride | .64 " |
| Magnesium fluoride | .087 " |
| Nickel fluoride | .20 " |
| Strontium fluoride | .117 " |

My invention is not restricted to the above enumerated fluorides, but includes all fluorides whose solubility in water is less than that of barium fluoride. My invention involves an insecticide the essential ingredient of which is formed by a fluoride the solubility of which in water is less than that of barium fluoride.

For use as an insecticide, these fluorides are applied in a similar manner to lead arsenate powder. The fluorides in finely powdered form may be dusted upon the vegetation which it is designed to protect against insects or they may be added to water and the mixture sprayed on. Other well known insecticides and fungicides, such as Bordeaux, powdered sulphur, lime sulphur solution, nicotine solution, etc., may be mixed with these fluorides and the combination applied either as a dust or as a spray.

I prefer to use these fluorides in the form of a powder of such fineness that not less than 90% will pass a 200 mesh test sieve. With regard to the fineness of the powder, in general the finer the powder the quicker and more complete the insecticidal action. A powder which will just pass a 80 or 100 mesh sieve is effective, but a powder which passes a 200 mesh sieve is very much more effective. It is very difficult to get a powder 100% of which will pass a 200 mesh sieve, but it is possible and practical to obtain one 90% of which will pass a 200 mesh sieve, the other 10% being fine enough to pass a 100 mesh sieve.

What I claim is:

1. An insecticide for dusting or spraying vegetation containing a fluoride whose solubility in water is less than that of barium fluoride as its essential ingredient, and reduced to a powder of a fineness suitable for dusting or spraying purposes.

2. An insecticide for dusting or spraying vegetation containing a fluoride whose solubility in water is less than that of barium fluoride as its essential ingredient, and reduced to a powder of a fineness so that approximately 90 per cent. will pass through a substantially 100 mesh test sieve.

RURIC C. ROARK.